June 7, 1955 G. MARKUS ET AL 2,710,046
ORNAMENTAL SHEET MATERIAL AND METHOD OF MAKING SAME
Filed Nov. 24, 1954 2 Sheets-Sheet 1

INVENTORS
George Markus
Martin Siegel
BY
ATTORNEYS

United States Patent Office 2,710,046
Patented June 7, 1955

2,710,046

ORNAMENTAL SHEET MATERIAL AND METHOD OF MAKING SAME

George Markus, West Orange, N. J., and Martin Siegel, Roslyn, N. Y., assignors to Aristocrat Leather Products, Inc., New York, N. Y., a corporation of New Jersey Application November 24, 1954, Serial No. 470,869

10 Claims. (Cl. 154—125)

This invention relates generally to a method of bonding and contouring plastic sheet materials and articles.

The primary aim and object of the present invention is to simplify the art of bonding and contouring plastic sheet materials and articles and to reduce the cost of manufacture of the same. Pursuant to this object of the present invention plastic sheet material is bonded and contoured at the same time and in the same operation to form a bonded and contoured plastic sheet assembly or article.

Another object of the present invention is the provision of a method for simultaneously bonding and contouring plastic materials by the application of heat externally of said material.

Another object of the present invention is the provision of the method for simultaneously bonding and contouring plastic materials which can be practiced by the utilization of conventional apparatus in the main.

Another object of the present invention is the provision of a method for simultaneously bonding and contouring plastic material in which a minimum of material is required for the practice of such method with very little, if any, waste material resulting from the practice of such method.

Yet another object of the present invention is the provision of a generally improved method of making contoured and bonded plastic sheet assemblies and articles.

The above and other objects, features and advantages of the present invention will be more fully understood from the following description considered in connection with the accompanying illustrative drawings.

In the drawings which illustrate the best modes now contemplated by us for carrying out our invention:

Figure 1:
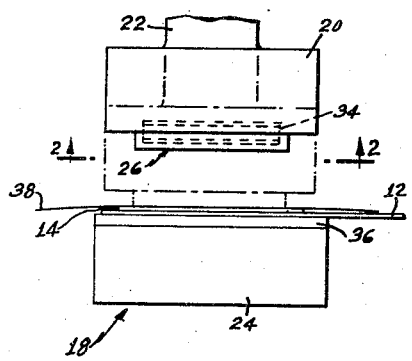
Fig. 1 is a side elevational view of a heat press showing plastic sheet material positioned on the bed thereof preparatory to the contouring and bonding operation.

Referring to the drawings and more particularly to Figs. 1 through 7 thereof, there is shown a contoured and bonded plastic sheet assembly 10 which comprises sheets 12 and 14 of plastic material which are bonded to each other along the preselected decorative outline 16 by heat applied externally of said sheets, said plastic sheet assembly being formed by the method to be described in detail hereinafter.

Figure 2:
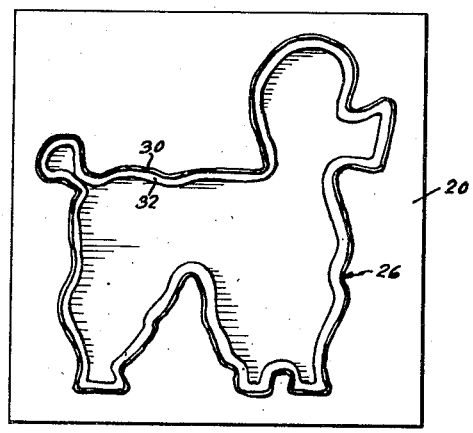
Fig. 2 is a sectional view, on an enlarged scale, taken on the line 2—2 of Fig. 1.
Figure 3:
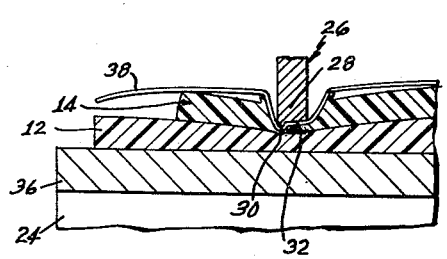
Fig. 3 is a fragmentary sectional view, on a greatly enlarged scale, showing the die of the press in operative position for contouring and bonding the plastic sheet material.

The apparatus 18 shown in Fig. 1, utilized for the practice of the present invention, is conventional in the main and includes a head 20, mounted at the end of a vertically reciprocable ram 22, and a stationary bed 24, it being understood that the ram 22 is mounted for vertical reciprocation in any suitable manner whereby to vertically reciprocate the head 20 relative to its companion stationary bed 24. Mounted on the lower end of the head 20, in any suitable manner, is a die 26 which is best shown in Fig. 2, said die having a peripherally continuous raised face 28 of preselected decorative outline, for example the outline of a dog. As will be apparent from the description which follows the die face 28 may be of any desired outline or contour corresponding to the desired contour of the plastic decorative segment 42 of the plastic composite or assembly shown in Fig. 6, the specific contours illustrated and described herein being given by way of example only. The die face 28 has a peripherally continuous edge portion 30 of an outline corresponding to the outline of said die face projecting from the outer side edge of said face, said projecting edge portion 30 being adapted to penetrate or indent the ornamental material 14 to form the tear edge 40 in the manner to be described in detail hereinafter. The peripheral edge 32 of the die face 28 is adapted to bond the plastic sheets 12 and 14 along the outline 16 by heat applied externally of the plastic sheets, there being provided any suitable heating means 34 in the head 20 of apparatus 18 for heating the die 26 to the desired operating temperature. Disposed on the bed 24 of apparatus 18 is a suitable plate 36 which is adapted to dissipate heat from the plastic sheet material 12 and 14 during the bonding and contouring operation, it being apparent that said dissipating plate may be formed of any suitable heat conducting material, for example a suitable metallic conductor such as aluminum. While it is within the scope of the present invention to practice the method described herein without the utilization of a heat dissipating or conducting plate 36, it is preferred in the practice of such method to utilize such a plate in order to achieve a superior bond. It will be understood that if a plate 36 of a non-heat conducting material were utilized, for example a plate formed of cardboard or other fibrous material, the operating time for the bonding and the contouring operation would be decreased and the bond so produced may not be of comparable quality as where a plate 36 of good heat conducting material is utilized.

In the bonding and contouring operation a parting agent is disposed between the plastic sheet material and the die face 28 to prevent the adhesion of such die face to the bonded and contoured plastic sheet assembly 10', said parting agent being constituted by a sheet 38 of Teflon (polytetrafluoroethylene) pursuant to the preferred embodiment of practicing the method of the present invention. The Teflon sheet material 38 is flexible and follows the curvature of the outline of the die face 28 in a desired manner and permits the heat concentrated along said die face to be readily transmitted to the plastic sheets for the bonding and contouring operation. Pursuant to the method of the present invention any thermoplastic material may be bonded and contoured, for example any of the well known vinyl plastics, the latter having a melting point of approximately 300° F. The operating temperature of the die 26 must be considerably above the melting point of the plastic material constituting the work to be bonded and contoured and where vinyl plastic material is utilized the operating temperature of such die should be approximately 50° to 150° F. above the melting point of such plastic material with 150° F. above such melting point being preferred. Thus the operating temperature of the die 26 must be considerably above the melting point of the work and must be below that of the melting point of the parting agent which, in the case of Teflon, is approximately 550° F. The operating temperature of the die is preferably about 450° F. and the time of the action of the die on the material for the bonding operation is about three seconds. It will be obvious however to persons skilled in the art of bonding plastic materials that the temperature may be increased or decreased within limits according to the pressure applied to the die in performing the bonding operation. Thus Teflon sheet material 38 is preferably utilized in the practice of the method of the present invention as a parting agent where the work is constituted by vinyl plastic material since such material 38 has a melting point greatly above the operating temperature of the die 26 and since it has the requisite physical characteristics of flexibility and tensile strength. Although Teflon sheet material is utilized as a parting agent pursuant to the preferred mode of practicing the invention, if desired, aluminum sheet material or Mylar (Polyester) which has a melting point of approximately 480° F., may be utilized.

In the practice of the present method the plastic sheets 12 and 14 are superposed on each other and are superposed on the heat dissipating plate 36 which is mounted on the bed 24 of the apparatus 18. It will be understood that the plastic sheets 12 and 14 may be of any desired determinate or indeterminate outline and, if desired, the plastic sheet material 14 may be superposed on any desired plastic material in sheet form as indicated at 12 or in any other desired form. The Teflon sheet 38 is disposed between the uppermost plastic sheet 14 and the face 28 of the die 26 and the ram 22 is reciprocated in a downward direction so as to reciprocate the die face 28 to the position shown in Fig. 3 in which said die face is effective to bond or fuse the plastic sheet material 12 and 14 and to contour the edge of sheet 14 in situ on sheet 12. Care is exercised in the practice of this technique so that the die face 28 does not penetrate too far into the plastic sheet material and it will be understood that the die 26 will be effective to bond such plastic sheets by heat emanating externally thereof from the peripherally extending sealing edge 32 of said die face. The plate 36 will conduct heat rapidly away from the plastic base layer 12 and the superposed layer 14, and the Teflon sheet material 38 serves as a parting agent between the die 26 and said layer 14 of plastic sheet material. Thus the edge 32 of the die face 28 constitutes a sealing or bonding edge and the projecting edge portion 30 is adapted to indent or penetrate the uppermost plastic sheet or layer 14 a sufficient amount to define a tear edge 40 along the outside of the bonded outline 16' of the plastic sheet assembly 10' i. e., without penetrating entirely through layer 14.

Figure 4:
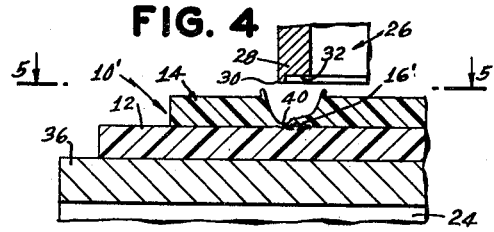
Fig. 4 is a view similar to Fig. 3 showing the die in elevated position subsequent to the contouring and bonding operation.
Figure 5:
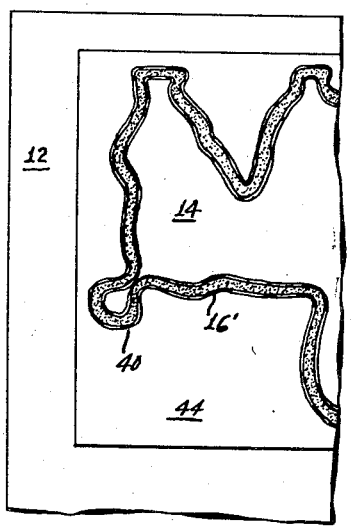
Fig. 5 is a view taken on the line 5—5 of Fig. 4 showing a plan of the bonded and contoured plastic sheet assembly preparatory to the removal of material along the tear edge.
Figure 6:
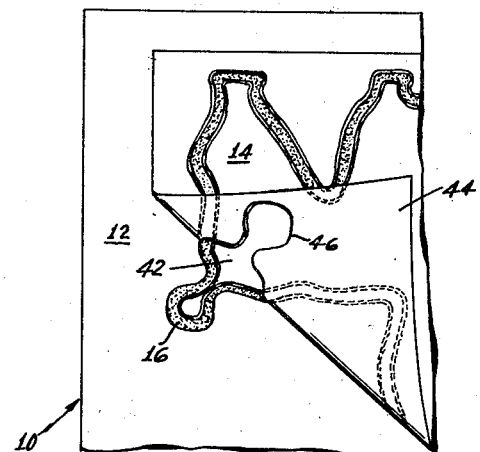
Fig. 6 is a view similar to Fig. 5 illustrating the operation of removing material along the tear edge.
Figure 7:
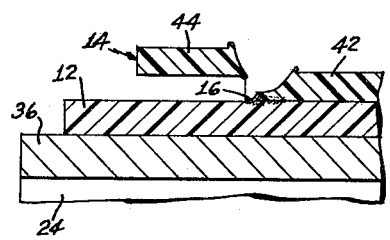
Fig. 7 is a view similar to Fig. 4 illustrating the operation of removing material along the tear edge.

Subsequent to the above described bonding and contouring operation, the ram 22 is reciprocated upwardly as shown in Fig. 4, away from the work, to leave on the bed 24 a bonded and contoured plastic sheet assembly 10' which is in intermediate stage of finish. Thus the above described contouring and bonding operation will result in the sealing or bonding edge 32 forming the bonded outline 16' of the plastic sheet assembly 10' with the projecting edge portion 30 defining a tear edge 40 along the outside periphery of said bonded outline. The semi-finished plastic sheet assembly 10' is formed into a finished plastic sheet assembly 10 by removing the sheet material 44 of sheet 14 along the tear edge 40, this removal of sheet material being effective to contour the sheet 14 to form the segment 42 of desired outline or peripheral edge contour. The plastic sheet material 44, outside of the contoured area 42, may be readily removed from the plastic assembly 10' by grasping a portion of the material 44 and pulling said material to separate it from the bonded area of outline 16' along the tear edge 40. Accordingly, the operation of tearing the material 44 from the bonded segment 42 will result in the formation in situ of a bonded segment having a bonded marginal edge portion and a peripheral edge contour corresponding to the outline of the die face 28. The separated sheet material 44 has a cut out area 46 of corresponding edge outline, it being understood that sheet material 44 having such a preselected decorative outline may be utilized in any desired manner, for example, for integration with other materials to form a decorative composite assembly. Thus each of the components 42 and 44 of the plastic sheet material 14 may be utilized whereby it will be apparent that the instant method is inherently economical with very little, if any, waste material resulting from the practice of such method.

It will be apparent from the above that the contoured and bonded plastic sheet assembly 10 comprises a sheet of plastic material 12 having a decorative segment 42 of plastic material bonded thereto along the bonded outline 16, said sheet and segment being free from direct connection to each other except along said bonded outline. Thus the segment 42 is bonded to the sheet 12 so as to define a tear edge 40 along the outside periphery of the bonded area 16, said segment being thus initially an integral part of the sheet material 14 which may be of indeterminate contour and which is contoured to form said segment by removing the material 44 along said tear edge. Thus the plastic sheet material 12 and 14 is bonded and contoured at the same time and in the same operation to form the bonded and contoured plastic sheet assembly 10. The sheet 14 may be of any desired contour, said sheet being contoured in the operation of bonding such sheet to other plastic sheet material, for example sheet 12.

The plastic sheet assembly 10 may be utilized in any desired application, for example in the formation of articles such as wallets, vanity articles and the like. It will be understood that the plastic sheets 12 and 14 may be formed of the same material or may be formed of different compatible materials so that such materials will bond together in the aforedescribed manner. The method of the present invention may be practiced by the use of plastic sheet material 12 which is not homogeneous, for example plastic coated paper, cardboard, leather, cloth, or the like or by the use of plastic sheet material 12 and 14 having incorporated therewith metallic material and the term "plastic sheet material" and "plastic material" as used herein is intended to have a generic connotation and to include homogeneous plastic sheet material as well as plastic coated material in the case of the sheet material 12 and plastic material having metallic particles incorporated therein or therewith in the case of sheet material 12 and 14. While in the embodiment above described two plastic sheets 12 and 14 are utilized, it will be understood that it is within the scope of the present invention to bond and contour more than two of such sheets in the same operation.

Figure 8:
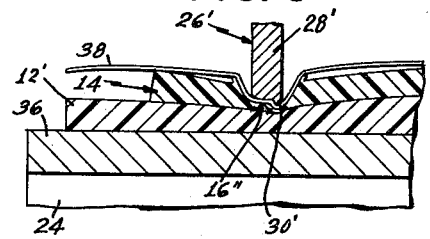
Fig. 8 is a view similar to Fig. 3 illustrating a modified form of the present invention.
Figure 9:
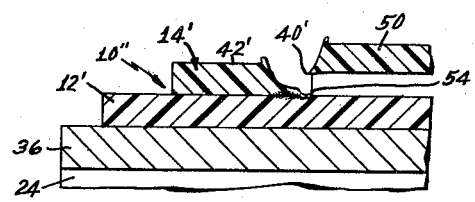
Fig. 9 is a view similar to Fig. 7 and is illustrative of the operation of removing material along the tear edge pursuant to such modified form of invention.
Figure 10:
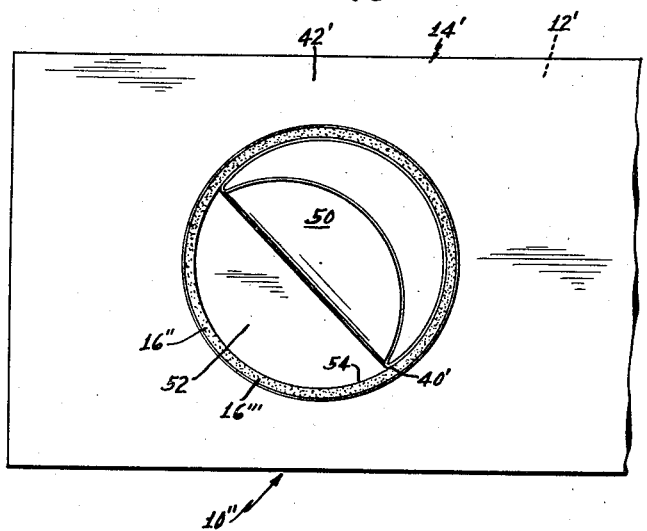
Fig. 10 is a view similar to Fig. 6 according to the modified form of invention illustrated in Figs. 8 and 9.

With reference to Figs. 8, 9 and 10, there is shown a modified form of the present invention which is similar to the form described above except in the specific respects now to be pointed out in detail. Pursuant to this modified form, the die face 28' of die 26' is provided with a peripherally continuous edge portion 30' which corresponds to the edge portion 30 described above except that edge portion 30' projects from the inner side edge of said die face. Thus the contouring and bonding operation utilizing the die 26' will result in the formation of a tear edge 40' disposed along the inside periphery of the bonded outline or area 16″, the sheet material 50 of the plastic material 14′ being separated along said tear edge to form the plastic sheet assembly 10″. The contoured and bonded plastic sheet assembly 10″ comprises a sheet of plastic material 12′ having a segment 42′ of plastic material bonded thereto along the preselected outline 16‴ corresponding to the outline of the die face 28′, said segment being cut away along the tear edge 40′ which is constituted by the inside edge 54 of the bonded outline to reveal the portion 52 of the plastic sheet 12′ through the cut away part defined by the removed segment 50. In the illustrated embodiment the die face 28′ is of circular contour and accordingly, the cutaway sheet material or segment 50 and the outline of the segment 42′ defined by such cutaway sheet material or segment 50 will be of circular contour. Thus the bonded segment 42′ is initially an integral part of the sheet material 14′, which may be of indeterminate contour and which is contoured to form said segment of desired outline, corresponding to the outline of the die face 28′, by removing the sheet material 50 along the tear edge 40′. Thus the sheet material or segment 50 will have an outside contour corresponding to the contour of the peripheral edge 54 of the segment 42′ and it will be understood that the segment 50 may be used in any desired application, for example to form other composite assemblies or articles. Thus both constituents 42′ and 50 of the plastic sheet material 14′ initially provided may be utilized in any desired decorative application whereby it will be apparent that the technique described above is inherently very economical. Accordingly, the embodiment illustrated in Figs. 8 through 10 is similar to the embodiment illustrated in Figs. 1 through 7 except that the die face 28′ of the embodiment illustrated in Figs. 8 through 10 will be operative to provide a tear edge 40′ along the inside edge of the bonded area so as to form a contoured and bonded plastic sheet assembly having a bonded segment 42′ with a cutaway area. The base sheet material 12′ may have glitter material incorporated therein or therewith in which case such material will be visible through the cutaway area of segment 42′.

The above described method for simultaneously bonding and contouring plastic materials may thus be practiced by the utilization of conventional apparatus in the main and the die utilized for the contouring and bonding operation will have a very long life.

While we have shown and described the preferred embodiments of our invention, it will be understood that various changes may be made in the idea or principles of the invention within the scope of the appended claims.

Having thus described our invention, what we claim and desire to secure by Letters Patent is:

1. In an ornamented article, a base layer, and an ornamental element formed of thermoplastic sheet material mounted on the outer side of said base layer in superposed relation thereto, said ornamental element having a peripheral marginal edge terminating inwardly of the outer edge of said base layer and fused in fixed relation thereto, said ornamental element having a peripheral edge contour formed in situ on said base layer and being different from the peripheral edge contour of said base layer.

2. Ornamented sheet material having superposed layers comprising thermoplastic sheet material, one of said layers being fused in relation to the other of said layers along a line disposed inwardly of the outer edge of the other layer, said line of fusion defining in situ an edge of predetermined contour on said one layer spaced from the outer edge of the other layer.

3. An ornamental plastic sheet assembly, comprising a plastic sheet material base having an ornamental element formed of plastic sheet material fused thereto on the surface thereof along a preselected decorative outline, said last mentioned plastic sheet material being initially of indeterminate contour and extending beyond said outline and being contoured to said outline to form said ornamental element by removing said extending material thereof along said outline, said plastic sheet base extending outwardly beyond said outline.

4. An ornamented plastic sheet assembly, comprising a plastic sheet material base having an ornamental element of plastic sheet material fused thereto along the peripheral outline thereof, said base and said ornamental element being free from direct connection to each other except along said peripheral outline, said ornamental element being of smaller area than said base and having a tear edge surrounding said outline adjacent thereto, said element being initially an integral part of sheet material of indeterminate contour which is contoured to said outline to form said ornamental element by removing material thereof along said tear edge.

5. In an ornamented article, a base layer, and an ornamental element formed of thermoplastic sheet material mounted on the outer side of said base layer in superposed relation thereto, one of said base layer and ornamental element having ornamental material incorporated therein for imparting a decorative effect thereto, said ornamental element having a peripheral marginal edge terminating inwardly of the outer edge of said base layer and fused in fixed relation thereto, said ornamental element having a peripheral edge contour formed in situ on said base layer and being different from the peripheral edge contour of said base layer.

6. The method of providing an ornamental element on the surface of a base layer of sheet material, said method comprising the steps of superposing a sheet of thermoplastic ornamental material in overlying relation to said base layer, heat fusing said sheet of ornamental material in position on said base layer along a peripherally extending line disposed inwardly of the peripheral edge of said base layer providing a preselected decorative outline and simultaneously defining an indented tear edge on said ornamental material corresponding to said decorative outline with said indentation extending into the upper surface of said ornamental material and terminiating above the lower surface thereof, and thereafter removing from said ornamental material along said tear edge the portions thereof which extend beyond said tear edge to contour the edge of said ornamental material to said preselected outline and thereby form said ornamental element with a peripheral edge disposed inwardly of the peripheral edge of said base layer.

7. The method of providing an ornamental element on the surface of a base layer of plastic sheet material, said method comprising the steps of superposing a sheet of thermoplastic ornamental material in overlying relation to said base layer, applying to the surface of said ornamental material a heated die having a face of preselected decorative outline and a plastic-indenting edge surrounding said face with a parting agent disposed therebetween to heat fuse said last mentioned material in position on said base layer along a peripherally extending edge disposed inwardly of the peripheral edge of said base layer providing a preselected decorative outline corresponding to the outline of said die face and simultaneously defining an indented tear edge on said ornamental material corresponding to said decorative outline with said indentation extending into the upper surface of said ornamental material and terminating above the lower surface thereof, and thereafter removing from said ornamental material along said tear edge the portions thereof which extend beyond said tear edge to contour the edge of said ornamental material to said preselected outline and thereby form said ornamental element with a peripheral edge disposed inwardly of the peripheral edge of said base layer.

8. The method of providing an ornamental element on the surface of a base layer of plastic sheet material, said method comprising the steps of superposing on a heat dissipating base a sheet of thermoplastic ornamental material in overlying relation to said base layer, applying a heated die having a face of preselected decorative outline to the surface of said ornamental material with a parting agent disposed therebetween to heat fuse said last mentioned material in position on said base layer along a peripherally extending edge disposed inwardly of the peripheral edge of said base layer providing a preselected decorative outline corresponding to the outline of said die face and simultaneously defining an indented tear edge on said ornamental material corresponding to said decorative outline with said indentation extending into the upper surface of said ornamental material and terminating above the lower surface thereof, said base providing for the rapid conduction of heat away from said plastic sheet material positioned thereon, and thereafter removing from said ornamental material along said tear edge the portions thereof which extend beyond said tear edge to contour the edge of said ornamental material to said preselected outline and thereby form said ornamental element with a peripheral edge disposed inwardly of the peripheral edge of said base layer.

9. The method of providing an ornamental element on the surface of plastic sheet material, said method comprising the steps of superposing plastic sheet material of indeterminate contour in overlying relation to said first mentioned sheet material with one of said sheet materials having metallic material incorporated therein, fusing said material of indeterminate contour in position on said first mentioned sheet material along a peripherally extending edge disposed inwardly of the peripheral edge of said base layer by heat applied externally of said sheet material providing a preselected decorative outline and simultaneously defining an indented tear edge on said material of indeterminate contour only corresponding to said outline with said indentation extending into the upper surface of said material of indeterminate contour and terminating above the lower surface thereof, and thereafter removing from said material of indeterminate contour along said tear edge the portions thereof which extend beyond said tear edge to contour said last mentioned material to said preselected outline and thereby form said ornamental element with a peripheral edge disposed inwardly of the peripheral edge of said base layer.

10. Ornamented sheet material having superposed layers comprising thermoplastic sheet material, one of said layers being fused in relation to the other of said layers along a line disposed inwardly of the outer edge of the other layer, said line of fusion defining in situ an edge of predetermined contour on said one layer spaced from the outer edge of the other layer, said one layer having an opening therethrough overlying said other layer and outlined by said edge of predetermined contour.

References Cited in the file of this patent

UNITED STATES PATENTS

| | | |
|---|---|---|
| 1,978,048 | Heintz | Oct. 23, 1934 |
| 2,304,787 | Avery | Dec. 15, 1942 |
| 2,307,909 | Avery | Jan. 12, 1943 |
| 2,470,493 | Karfiol et al. | May 17, 1949 |
| 2,631,646 | Gannon et al. | Mar. 17, 1953 |